No. 823,454. PATENTED JUNE 12, 1906.
W. S. WHITE.
VEHICLE WHEEL.
APPLICATION FILED JULY 29, 1905.
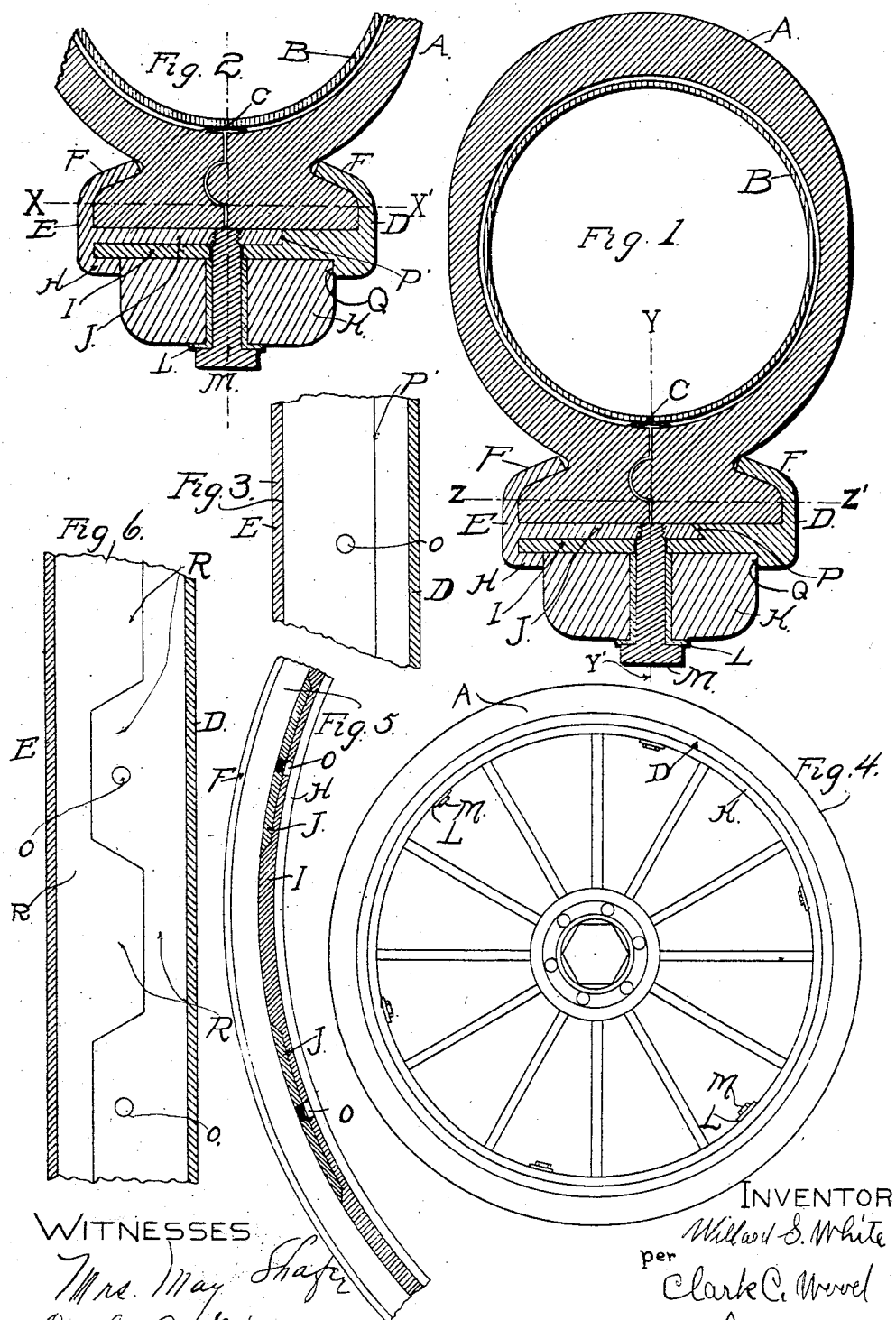
WITNESSES
Mrs. May Shafer
C. L. Atkinson
INVENTOR
Willard S. White
per
Clark C. Wevel
ATTORNEY

UNITED STATES PATENT OFFICE.

WILLARD S. WHITE, OF CHATTANOOGA, TENNESSEE.

VEHICLE-WHEEL.

No. 823,454.  Specification of Letters Patent.  Patented June 12, 1906.

Application filed July 29, 1905. Serial No. 271,739.

*To all whom it may concern:*

Be it known that I, WILLARD S. WHITE, a citizen of the United States, residing at Chattanooga, in the county of Hamilton and State of Tennessee, have invented a new and useful Improvement in Vehicle-Wheels, of which the following is a specification.

My invention relates to devices for securing vehicle-tires to the rims, and especially to that class of devices which are used with what are known as "clencher" tires; and its purpose is to make a device that will hold the tire rigidly and securely in position, that will be durable, simple, and economical of construction, and easy of manipulation.

In the drawings, Figure 1 represents a cross-section of my device with the accompanying rim and tire, the cross-section being taken through one of the bolts securing the device in position. Fig. 2 is a partial cross-section showing a different style of joint. Fig. 3 is a longitudinal section of Fig. 2 along the line X X', the felly, bolts, and tire being removed; Fig. 4, an elevation of an entire wheel employing my device: Fig. 5 is a longitudinal section of Fig. 1 along the line Y Y', the felly, bolts, and tire being removed. Fig. 6 is a longitudinal section of Fig. 1 along the line Z Z'. In both these figures the felly, tire, and bolts are removed to show the structure more clearly.

Referring to the drawings, K represents the felly or rim of a vehicle-wheel which is of any ordinary construction, having a flat outer surface, and forms no part of my invention. Upon the outer surface of this rim is mounted a tire or outer rim D. This rim D is provided with an inwardly-projecting bead or flange Q, adapted when in position on the wheel to rest against the side of the rim K of the wheel, thus assisting in retaining the rim D in position. In its preferable construction a series of dovetailed recesses R, Fig. 6, are formed in the upper surface of the rim D. I also prefer that these recesses should have the inner edge dovetailed or cut under, as shown at P in Fig. 1; but, if desired, this edge may be plain, as shown at P' in Fig. 2, or the dovetailed recesses may be dispensed with and a straight recess or rabbet, as shown in Fig. 3, may be employed; but I much prefer the construction shown in Figs. 1 and 6 as being more secure.

A second rim E, having its body portion J cut into the same form as and adapted to engage with the recesses in the rim D, is mounted outside of the rim D, as shown in Figs. 1 and 2. In place of the bead Q the rim E is provided with an inwardly-curved flange H, adapted to receive the edge of the body I of the rim D, thus serving to hold the rim E from separating from the rim D. The inner edge P of the body J of the rim E is preferably dovetailed or beveled to fit the form of the dovetailed recesses P in the flange D, thus holding the inner edge of the rim E also securely to the rim D when the rim E is in position.

Both the rims D and E are provided with outwardly-extending flanges F, adapted to receive lugs formed on the vehicle-tire. These flanges are of any suitable form, according to the style of tire employed. The rims D and E are secured to the rim K preferably by bolts M, passing through the rim K and the rim D, and screwed into the body J of the rim E. Thimbles L are preferably used to prevent wear; but I do not desire to limit myself to a construction employing these thimbles, and any other suitable means for securing the rims D and E to the rim K may be also employed without departing from the spirit of my invention.

It is evident that by loosening the bolts M the rim E can be drawn out laterally from the wheel, and thus removed, releasing the tire A. On the other hand, when the bolts M are tightened up the rims D and E and the rim K are securely fastened together. The rim D may also be removed by entirely withdrawing the bolts M; but it is not ordinarily necessary that this should be done.

What I claim as my invention, and desire to secure by Letters Patent, is—

1. In combination with a vehicle-wheel, an outer rim or tire provided along one edge with an outwardly-projecting tire-retaining flange and an inwardly-projecting bead, and having a rabbeted outer surface, a second rim having its body portion adapted to fit the rabbeted outer surface of the first rim and provided with an outwardly-extending tire-retaining flange, and an inwardly-extending flange adapted to embrace the edge of the previously-mentioned rim, and means of securing said rims to said felly.

2. In combination with a vehicle-wheel, an outer rim or tire provided along one edge with an outwardly-projecting tire-retaining flange and an inwardly-projecting bead, and having a dovetailed rabbeted outer surface, a second rim having its body portion adapted to fit the dovetailed rabbeted outer surface of the first rim and provided with an outwardly-extending tire-retaining flange, and an inwardly-extending flange adapted to embrace the edge of the previously-mentioned rim, and means of securing said rims to said felly.

3. In combination with a vehicle-wheel, an outer removable rim or tire provided along one edge with an outwardly-projecting tire-retaining flange and an inwardly-projecting bead, and having a dovetailed rabbeted outer surface, a second removable rim having its body portion adapted to fit the dovetailed rabbeted outer surface of the first rim and provided with an outwardly-extending tire-retaining flange and an inwardly-extending flange adapted to embrace the edge of the previously-mentioned rim, and means of securing said rims to said felly.

4. In combination with a vehicle-wheel, an outer removable rim or tire provided along one edge with an outwardly-projecting tire-retaining flange and an inwardly-projecting bead adapted to engage with one side of said felly, said rim having a dovetailed rabbeted outer surface, a second removable rim having its body portion adapted to fit the dovetailed rabbetted outer surface of the first rim and provided with an outwardly-extending tire-retaining flange and an inwardly-extending flange adapted to embrace the edge of the previously-mentioned rim, and means of securing said rim to said felly.

5. In combination with a vehicle-wheel, an outer removable rim or tire provided along one edge with an outwardly-projecting tire-retaining flange and an inwardly-projecting bead adapted to engage with one side of said felly, said rim having a dovetailed rabbeted outer surface, a second removable rim having its body portion adapted to fit the dovetailed rabbeted outer surface of the first rim and provided with an outwardly-extending tire-retaining flange and an inwardly-extending flange adapted to embrace the edge of the previously-mentioned rim, and abut against one side of said felly and means of securing said rim to said felly.

6. In combination with a vehicle-wheel, an outer removable rim or tire provided along one edge with an outwardly-projecting tire-retaining flange and an inwardly-projecting bead adapted to engage with one side of said felly, said bead having a dovetailed rabbeted outer surface, a second rim having a dovetailed body portion adapted to engage with the dovetailed rabbeted outer surface of said first rim and provided with an outwardly-extending tire-retaining flange and an inwardly-extending flange adapted to embrace the edge of the previously-mentioned rim, and abut against one side of said felly, and means of securing said rim to said felly.

In testimony whereof I have signed my name to this specification in the presence of two subscribing witnesses.

WILLARD S. WHITE.

Witnesses:
J. L. WHITE,
CHAS. S. BATES.